United States Patent [19]

Knuuttila et al.

[11] Patent Number: 5,290,748
[45] Date of Patent: Mar. 1, 1994

[54] POLYMERIZATION CATALYST FOR OLEFINES

[75] Inventors: Hilkka Knuuttila, Porvoo; Eeva-Liisa Lakomaa, Espoo, both of Finland

[73] Assignee: Neste Oy, Espoo, Finland

[21] Appl. No.: 912,211

[22] Filed: Jul. 16, 1992

Related U.S. Application Data

[63] Continuation-in-part of Ser. No. 641,901, Jan. 16, 1991, abandoned.

[30] Foreign Application Priority Data

Jan. 16, 1990 [FI] Finland ................................. 900255
Jul. 16, 1991 [FI] Finland ................................. 913438

[51] Int. Cl.$^5$ ................................................ C08F 4/22
[52] U.S. Cl. ................................... 502/228; 502/256; 502/306; 502/308; 502/309; 502/319; 502/320
[58] Field of Search ............... 502/228, 256, 306, 308, 502/309, 319, 320

[56] References Cited

U.S. PATENT DOCUMENTS

| | | | |
|---|---|---|---|
| 3,346,511 | 10/1967 | Hill | 502/256 |
| 4,013,822 | 3/1977 | Feichtinger et al. | 502/117 |
| 4,054,539 | 10/1977 | Hensley, Jr. | 502/66 |
| 4,147,849 | 4/1979 | Liu et al. | |
| 4,184,979 | 1/1980 | Kirch et al. | |
| 4,362,654 | 12/1982 | Vance, Jr. et al. | 252/469 |
| 4,439,543 | 3/1984 | McDaniel et al. | 502/228 |

OTHER PUBLICATIONS

McDaniel, MP, "The State of Cr(VI) on the Phillips . . .," *Journal of Catalysis* 76, 17–28 (1982), (no month available).

*Primary Examiner*—Patrick P. Garvin
*Assistant Examiner*—Brent M. Peebles
*Attorney, Agent, or Firm*—Birch, Stewart, Kolasch & Birch

[57] ABSTRACT

The present invention concerns a polymerization catalyst of olefins, said catalyst containing an active chromium compound on an inorganic support. The catalyst in accordance with the invention is prepared by vaporizing a precursor of chromium oxide such as chromyl chloride and allowing the chromium oxide vapor to react with the surface of, e.g., silica gel support material at 160° . . . 500° C. A selective binding of the chromium oxide to the support material is achieved by keeping the vapor pressure sufficiently high and the duration of interaction with the support sufficiently long so as to maintain an excess of the chromium compound in relation to the number of available binding sites on the support material. The activity of a catalyst in accordance with the invention even with a very low content of catalytic metal is as high as the activity of a catalyst of an appreciably higher metal content that has been prepared by the methods of the conventional technology.

20 Claims, No Drawings

POLYMERIZATION CATALYST FOR OLEFINES

This application is a continuation-in-part of prior U.S. application Ser. No. 07/641,901 filed Jan. 16, 1991, now abandoned.

The present invention relates to a polymerization catalyst for olefins in accordance with the preamble of claim 1, said catalyst comprising a catalytically active chromium compound on an inorganic support.

The conventional Phillips-type polymerization catalyst, invented at the beginning of the 1950's, contains chromium(VI)oxide bound to a silica gel support. A prior art method for the preparation of such chromium-containing catalysts includes the impregnation of an inorganic support with a chromium compound, typically an aqueous solution of chromium trioxide, followed by the calcination of the support by heating in an oxidizing atmosphere at an elevated temperature (400° C. or higher). Finally, the catalyst is activated by reduction with hydrogen, carbon monoxide or ethene, whereby unsaturated chromium compounds, which are active during polymerization, are formed at the surface of the support material.

A drawback of the conventional preparation method of catalysts is the need for several different phases of preparation. The preparation of the catalyst is extremely sensitive to processing conditions and thus requires strict control.

Another drawback is related to the use of solvents. Namely, the solvents used in preparation often are capable of reacting with the support material thus causing changes in its surface structure.

In addition to the above-mentioned drawbacks, the solvents often contain impurities which can adversely affect the activity of the catalyst.

Further, it is difficult to control the binding of the catalytically active materials to the surface of the support by the above-described preparation methods. This is the case in particular when the surface of the particles in the powdered support material used is structurally non-homogeneous.

Due to these factors, the prior art methods are not easily applicable to a controlled binding of a metal or metal compound.

Moreover, the dispersion of catalytically active materials in the support material remains poor in prior art methods.

The present invention is based on the concept of introducing the catalytically active metal or its compound in vapour phase in at least an equal or, preferably in an excess amount in relation to the number of available binding sites on the support material surface. Throughout the reaction, the support temperature is maintained above the condensation temperature of the vapour and simultaneously sufficiently high so as to attain the thermal activation energy necessary for the generation of bonds between the catalytically active material or its compound and the support material.

More specifically, the catalyst in accordance with the invention is mainly characterized by what is stated in the characterizing part of claim 1.

Within the scope of this application, the term "species" is used to designate the catalytically active component on the surface of the support. Said component can be in the form of, for instance, an atom, an ion, a molecule, a chemical compound or a complex. Normally, said active "species" consists of the metal ion or metal atom or metal compound on the surface of the support. In particular, said species designates chromium oxide possibly containing some halogen.

Interestingly, it has been discovered that by preparing a catalyst in the above-described manner, a heterogenous catalyst can be achieved whose activity even at very low contents of the catalytic metal species is as high as the activity of a catalyst of multiple content of catalytically active metal species that has been prepared by way of conventional methods.

As to the status of prior art technology, it can be noted that the binding of chromium to the surface of an inorganic support from the vapour phase in order to prepare polymerization catalysts for olefins is not novel in itself. Namely, the U.S. Pat. No. 4,362,654 discloses a method, in which metallic chromium is deposited in a vacuum evaporator onto the surface of silica. The catalyst thus obtained is subsequently activated by heating in an oxidizing atmosphere at 300° . . . 1000° C. to achieve an activated polymerization catalyst.

There are several drawbacks related to the above-described method. Metal binding on the support is not selective but instead, the chromium is deposited by condensation onto the support material particles. Chromium binding to the sites available in the pores is not controllable, because the actual chemical bond between the chromium metal and the support is formed only by postactivation. The control of the chromium content in the catalyst is not easily implemented, since a major part of the evaporated metal is condensed onto the walls of the reaction vessel. Therefore, the method fails to solve the above-described problems.

The U.S. Pat. No. 4,439,543 and the paper by M. P. McDaniel in the Journal of Catalysis, 76 (1982), pp. 17–28, teaches a method based on the injection of a known quantity, 0.5 . . . 4 ml, of chromyl chloride solution as such or diluted with carbon tetrachloride into a gas stream, and further, routing the stream onto a silica gel support. Prior to the addition of the chromium species, the silica gel has been heated in oxidizing conditions at 400° . . . 1000° C. in order to remove a portion of the hydroxyl groups. The injected chromyl halide reacts with silica so that the catalyst comprises both chromium and halogen species on the support. Finally, the chromium species is subjected to reduction by carbon monoxide, which was found to improve the catalyst activity.

The method in accordance with the present invention differs from the above-described methods: firstly in that the chemical bonds are formed between the metal or metal compound and the support, while no physically adsorbed metal or metal compound exists on the support material surface during the process. This goal is achieved by selecting a so high reaction temperature that no metal or metal compound exists in liquid or solid state. Secondly, the invention differs in that the formation of the surface bond is determined by the number of binding sites available and the reaction temperature for bonding. The metal or metal compound is applied in excess amount in relation to the binding sites available on the support material surface, contrastingly to the metering of a certain amount of chromium compound as necessary in the U.S. Pat. No. 4,439,543 and the impregnation methods. A third essential difference from conventional technology is that the method in accordance with the invention makes it possible to advantageously prepare catalysts in which two or more catalytically active species are bound from vapour phase onto the support material surface. Even the binding order of the species can be interchanged.

According to the invention, all reagents necessary for binding the metal compound are brought into the reaction chamber in gaseous state, typically only one at a time. The vapour pressure of the evaporated starting material is here maintained sufficiently high and the duration of the interaction with the surface of the support material sufficiently long so as to provide the compound in at least an equal amount to, or, preferably in an excess amount to the number of binding sites available on the support material surface. Naturally, the actual number of binding sites available on the support material surface itself is a crucial factor. This parameter can be modified by pretreatment methods.

The reaction temperature must not fall below the temperature necessary for evaporation of the chromium starting material in order to avoid condensation or sublimation of the compound. Further, the condensation of the compound on its way to the reaction space must be prevented by keeping the feed piping temperature at least at the evaporation temperature, preferably at the reaction temperature.

The metal compound (starting material, precursor) and the temperature used are selected so as to avoid decomposition of the metal compound and subsequent condensation of the decomposition products.

Using experimental methods, it is possible to determine a temperature range, or temperature span, in which the reaction is advantageously carried out. The lower limit of such a temperature span is determined by the condensation temperature of the metal compound to be evaporated at the pressure used and by the activation energy necessary for establishing the desired surface bond. Obviously, the condensation temperature of the compound is not applicable as the lower temperature limit if the condensation temperature does not impart the reagent a sufficient energy to exceed the activation energy. The upper limit is determined by the temperature at which the compound chemisorbed on the support starts to show an essential rate of desorption, that is, when the equilibrium of the chemisorption-desorption reaction has shifted toward desorption. Since the activation and desorption energies are not generally known, the appropriate temperature must be found by experimental means.

When chromyl chloride is used as the reagent and silica gel (silicon dioxide) as the support material, the temperature must advantageously be within the range 150° ... 400° C. According to one preferred embodiment, the temperature is kept below 360° C. According to another preferred embodiment, the pretreatment to be described below is carried out at a higher temperature than the actual reaction. Thus, high levels of chromium content are achieved by heating the support material at temperatures above approx. 350° C. and carrying out the actual reaction at temperatures below approx. 200° C.

Since, according to the invention, the number of binding sites affects the amount of active metal binding onto the support, the pretreatment and/or intermediate treatment of the support is an essential factor. The number of available binding sites can be affected by, e.g., a heat treatment which controls, among other factors, the number of hydroxyl groups on the support material surface, and by treatment with water vapour which correspondingly increases the number of hydroxyl groups. These treatments which modify the support material can be carried out when desired during any process step prior to the removal of the catalyst from the reaction chamber. The number of binding sites for the chromium compound can also be reduced by using a blocking agent which binds to isolated hydroxyl groups. Thus, as an example, the use of hexamethyl disilazane (HMDS) as a blocking reagent prior to the bonding of chromium acetylacetonate is described in working example 5.

The proportion of excess active material in relation to the concentration necessary to achieve a full saturation of all available binding sites on the support material surface (customarily called a monolayer coverage) is typically 1.5- ... 1000-fold, preferably 2- ... 100-fold. The amount of the chromium compound necessary for a monolayer coverage can be calculated from the area of the support material determined with the help of, e.g., the BET method, and from the known molecular structure of the support material surface.

According to the method in accordance with the invention, the reaction between the vapour of the catalytically active metal compound and the support can be carried out in an inert gas atmosphere or, alternatively, at reduced pressure preferably using an inert gas atmosphere of from 0.1 to 100 mbar pressure. Equally, the optional pre- and posttreatment steps are carried out in the same conditions as the actual reaction. A benefit gained from the use of a partial vacuum is that the reaction chamber is kept cleaner and the diffusion rate is increased. The reaction time is principally affected by the diffusion of vapour molecules into the support material pores. The diffusion of the vapour molecules between the support material particles is very rapid in comparison with their diffusion into the pores. Therefore, the reaction time must be sufficiently long to allow the vapour containing the metal or metal compound to reach adequate interaction with the binding sites of the support. In the tests performed, a reaction time of 1 ... 4 h proved sufficient for that purpose.

The evaporated reagent can be brought to the reaction chamber as such, or alternatively, using an inert carrier gas such as nitrogen or noble gases.

In the catalyst according to the invention, it is preferred to use as support materials inorganic oxides such as silica gel (silica), aluminium oxide, thorium oxide, zirconium oxide, magnesium oxide or titanium oxide, or mixtures thereof. Prior to the binding of the active metal, the support material can be pretreated in order to, e.g., reduce the number of hydroxyl groups on the support material surface by conventional means, one of which is heating in air stream at, e.g., 100° ... 800° C. The pretreatment can be carried out before the support material is loaded into the reaction space, or alternatively, in the reaction chamber itself prior to introducing the vapour of the active metal compound into the reaction chamber.

Besides chromium compounds, the catalytically active metal compound used in the catalyst in accordance with the invention can be a suitable aluminium compound. Applicable chromium compounds that will works as chromium oxide precursors are, among others, chromyl chloride, chromyl fluoride and chromyl fluorochloride. Chromyl chloride is particularly applicable by virtue of its high vapour pressure, which thus dispenses with the need for elevated temperatures. Chromium acetylacetonate is another suitable volatile chromium compound.

A suitable aluminium compound is aluminium trichloride, for instance.

After the heat treatment, the support material can be treated with water vapour in order to introduce new hydroxyl groups on its surface.

The catalysts in accordance with the invention can be catalysts containing chromium alone, or alternatively, such catalysts which contain aluminium compounds in addition to the chromium. The chromium and aluminium compounds can be introduced in a free order. Thus, the aluminium compounds can be introduced before or after the chromium compound.

The excess of the active metal compound used in each reaction step is removed before the next step by, e.g., flushing the reaction space with an inert gas.

After the binding of the active metal compound, the catalyst is activated by heating in an oxidizing atmosphere at 400° ... 1000° C. The activation is preferably carried out in the same reaction chamber, while it is also possible to perform the activation in a separate reaction vessel later at any instant prior to polymerization. The oxidizing conditions can be attained with the help of an oxygen-containing gas such as air.

In the following, the invention will be illustrated in more detail by means of working examples.

EXAMPLE 1

Polymeration catalysts containing chromium (possibly in the form of chromium oxide) were prepared as follows:

Silica gel support material (EP10, Crosfield Catalysts) was put into a reaction vessel, in which a protecting gas atmosphere with a pressure of 3 to 4 mbar was created. Next, the support was preheated at an elevated temperature. Then, chromyl chloride vapour was conducted to the reaction space and allowed to react with the support material. Finally, the excess chromyl chloride was removed from the reaction space, and the catalyst was activated by fluidizing, first in dry air and next by heating in steps first up to 200° C., then keeping it at this temperature for 4 h, and subsequently calcining at an elevated temperature for 5 h. After these steps the calcined material was cooled to 300° C. and the air atmosphere was replaced by oxygen-free nitrogen. The preparation conditions of the catalyst are given in table 1A below.

TABLE 1A

| Catalyst | Preheating [°C.] | [h] | $CrO_2Cl_2$ add. [mol/g/run] | Reaction [°C.] | min | Calcination [°C.] |
|---|---|---|---|---|---|---|
| A | 360 | 20 | 0.20 | 175 | 97 | 570 |
| B | 360 | 17 | 0.13 | 175 | 150 | 780 |
| C | 100 | 17 | 0.10 | 175 | 150 | 780 |

The obtained catalysts were used for ethene polymerization at 105° C. temperature and total pressure of 4000 kPa in an autoclave of 3 liter volume. The hydrocarbon diluent in the polymerization process was isobutane. The catalyst characteristics and polymerization results are shown in table 1B below.

TABLE 1B

| Catalyst | Quantity [g] | Cr [%] | Cl [%] | Yield [g] | Activity [gPE/gcat*h] |
|---|---|---|---|---|---|
| A | 0.2 | 1.4 | 0.32 | 140 | 1400 |
| B | 0.18 | 1.5 | | 220 | 1220 |
| C | 0.5 | 0.01 | <0.01 | 100 | 200 |

EXAMPLE 2

The method applied in Example 1 was followed to prepare several silica supported chromium catalysts. After the preheating, the temperature was controlled to the actual processing temperature. The chromyl chloride was evaporated and allowed to react with the silica at 175°, 270° and 360° C. temperatures. The reaction time was in excess of 1.5 h, typically 2.5 h.

The chromium content in the $CrO_3$ layer covering totally the surface of the silica support material was calculated to contain 0.16 g chromium per 1 g silica. This corresponds to a molar content of approx. 0.003 mol chromium. The reagent used in the tests was by an excess of 30- ... 70-fold.

The preheating temperature determines the number of OH— groups in silica and thus the number of binding sites. The chromyl chloride molecule can bind either to one or two hydroxyl groups releasing one or two molecules of HCl, respectively. The highest chromium concentrations were found after preheating at 270° C. Reaction temperatures for chromyl chloride between 150° ... 330° C. did not have a major effect on the chromium concentration.

EXAMPLE 3

A polymerization catalyst containing chromium and aluminium was prepared in a similar manner as in Example 1 with the exceptions that prior to chromium addition, the reaction space was filled with aluminium trichloride vapour at 270° C. and the vapour was allowed to react for 150 min, after which an additional water vapour treatment for 75 min was performed before the addition of chromium. The preparation conditions of the catalyst are given in Table 3A below.

TABLE 3A

| Catalyst | Preheating [°C.] | [h] | $CrO_2Cl_2$ add. [mol/g/run] | Reactions Cr [°C.] | [min] | Al [°C.] | [min] | Calc. [°C.] |
|---|---|---|---|---|---|---|---|---|
| G | 360 | 17 | 0.14 | 270 | 150 | 270 | 150 | 750 |

The obtained catalyst was used for ethene polymerization at 105° C. temperature and total pressure 4000 kPa. The hydrocarbon diluent in the polymerization process was isobutane. The catalyst characteristics and polymerization results are shown in table 3B below.

TABLE 3B

| Catalyst | Quantity [g] | Cr [%] | Al [%] | Cl [%] | Yield [g] | Activity [gPE/gcat*h] |
|---|---|---|---|---|---|---|
| G | 0.2 | 0.026 | 0.49 | 3.5 | 95 | 475 |

EXAMPLE 4

Silica support material (EP 10, Crosfield Catalysts) was loaded in an amount of 5 to 8 g into a reaction vessel after preheating in air for 16 h at different temperatures. Physisorbed water, if any, was removed by heating in an inert atmosphere (nitrogen flow) in a fixed support bed at a pressure in the range from 50 to 120 mbar. Chromium acetylacetonate was vaporized at 180° to 200° C. and conducted to the reaction vessel during 1 to 3 h in nitrogen flow. The reaction vessel was kept at a temperature of 200° C. during the bonding of Cr. After the reaction, the support bed was purged with nitrogen for 1 to 2 hours to remove any unreacted reagent.

The samples thus prepared were further calcinated at atmospheric pressure in a fluidized bed in air or nitrogen atmosphere at different temperatures.

The obtained catalysts were used for ethene polymerization as described in example 1. Table 4 presents the processing conditions of the catalysts and the polymerization results.

TABLE 4

| Sample | Preheating T/°C. | Activation T/°C. | Cr wt % | Cr (VI) wt % | PE g/g*h |
|---|---|---|---|---|---|
| H | 200 | 845 | 2.3 | 1.1 | 3100 |
| I | 560 | 855 | 1.1 | 0.9 | 5000 |
| J | 580 | 880 | 1.0 | 0.8 | 5500 |
| K | 780 | 820 | 0.6 | 0.5 | 3100 |
| L | 820 | 835 | 0.7 | 0.5 | 4700 |

Activity calculated as polyethylene/g catalyst*h

EXAMPLE 5

The number of binding sites for the Cr compound may be reduced by using a blocking agent known to bind to isolated hydroxyl groups. Thus, Cr acetylacetonate was bonded to silica EP 10 preheated at 200° C. and treated with the blocking reagent HMDS (hexamethyl disilazane) at 175° C. The Cr/silica sample was calcinated in the same reaction vessel at a pressure in the range from 80 to 130 mbar with dry synthetic air in a fixed bed.

Table 5 shows the processing parameters of the catalyst, Cr concentration and polymerization results.

TABLE 5

| Sample | Preheating T/°C. | Activation T/°C. | Cr wt % | Cr (VI) wt % | PE g/g*h |
|---|---|---|---|---|---|
| M | 200 | 650 | 0.7 | 0.6 | 3100 |

What is claimed is:

1. A polymerization catalyst for olefins, comprising: at least one catalytically active chromium compound adsorbed on an inorganic support, wherein said catalyst is prepared by a process comprising:

optionally subjecting the support material to a pretreatment in order to modify the number of binding sites available on the support;

vapourizing a chromium compound used as the precursor of chromium oxide;

routing the obtained vapour into a reaction chamber and reacting said vapour with the support material at a temperature within the range of the minimum temperature necessary to provide the activation energy for establishing chemisorption of the chromium compound onto the surface of the support up to the temperature at which the rate of desorption exceeds the rate of chemisorption of the chromium compound;

maintaining the vapour pressure of the chromium compound sufficiently high and the duration of interaction sufficiently long so as to provide at least an equal amount of the chromium compound as there are available binding sites on the support material;

removing the chromium compound not bound with the support material from said reaction chamber; and optionally, posttreating the heterogeneous chromium containing catalyst in order to increase its catalytic activity.

2. The catalyst according to claim 1, wherein said chromium compound used is chromyl fluoride, chromyl fluorochloride or chromyl chloride.

3. The catalyst according to claim 1, wherein said reaction is carried out at a temperature within the range of about 175° to 360° C.

4. The catalyst according to claim 1, wherein said pretreatment is carried out at a temperature above about 350° C. and the actual reaction at a temperature below about 200° C.

5. The catalyst according to claim 1, wherein said chromium compound is used in the reaction in excess amounts of about 2- to 100-fold in relation to the number of binding sites available on the support material surface.

6. The catalyst according to claim 1, wherein said support material is reacted with an evaporated aluminium compound after said optional pretreatment step.

7. The catalyst according to claim 1, wherein said chromium containing catalyst is reacted with an evaporated aluminium compound after the reaction between the chromium compound and the support material.

8. The catalyst according to claim 1, wherein said catalyst is posttreated by heating in air at 400° ... 1000° C.

9. The catalyst according to claim 1, wherein said pretreatment and the actual reaction steps are carried out under reduced pressure.

10. The catalyst according to claim 1, wherein said support material is an inorganic oxide.

11. The catalyst according to claim 8, wherein said reduced pressure is from 0.1 to 100 mbar.

12. The catalyst according to claim 9, wherein said inorganic oxide is selected from the group consisting of silica gel, aluminum oxide, thorium oxide, zirconium oxide, magnesium oxide, titanium oxide, and mixtures thereof.

13. The catalyst according to claim 1, wherein said chromium compound is chromium acetylacetonate.

14. The catalyst according to claim 12, wherein said reaction is carried out at about 175° to 300° C.

15. The catalyst according to claim 1, wherein the number of binding sites for the chromium compound is reduced by reacting said support with a blocking agent.

16. The catalyst according to claim 14, wherein said support is reacted with said blocking agent prior to the binding of the chromium compound.

17. The catalyst according to claim 14, wherein said blocking agent is hexamethyl disilazane.

18. The catalyst according to claim 1, wherein said process of preparing said catalyst includes said pretreatment step which comprises reacting said support with water vapour.

19. The catalyst according to claim 1, wherein said process of preparing said catalyst includes said pretreatment step which comprises heating said support at a temperature that is higher than the reaction temperature.

20. The catalyst according to claim 19, wherein said pretreatment step further comprises treating said support material with water vapour after said pretreatment with heat.

* * * * *